(12) United States Patent
Yoshida et al.

(10) Patent No.: US 7,798,462 B2
(45) Date of Patent: Sep. 21, 2010

(54) SLIDING-TYPE AUTOMOBILE SEAT

(75) Inventors: Masami Yoshida, Tochigi (JP);
Kazuyuki Aoki, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 351 days.

(21) Appl. No.: 11/913,787

(22) PCT Filed: May 12, 2006

(86) PCT No.: PCT/JP2006/309984
§ 371 (c)(1),
(2), (4) Date: May 13, 2008

(87) PCT Pub. No.: WO2006/121216
PCT Pub. Date: Nov. 16, 2006

(65) Prior Publication Data
US 2009/0032670 A1     Feb. 5, 2009

(30) Foreign Application Priority Data
May 12, 2005   (JP)   .............................. 2005-140216
May 12, 2005   (JP)   .............................. 2005-140227

(51) Int. Cl.
F16M 13/00   (2006.01)
(52) U.S. Cl. .................... 248/429; 248/424; 296/65.13; 297/344.11
(58) Field of Classification Search .............. 296/65.13, 296/65.18, 65.01; 297/344.11; 248/424, 248/429, 419
See application file for complete search history.

(56) References Cited
U.S. PATENT DOCUMENTS 5,829,728 A * 11/1998 Hoshihara et al. ........... 248/429
5,918,846 A * 7/1999 Garrido ....................... 248/429
6,007,040 A * 12/1999 Matsumoto et al. ......... 248/429
6,354,553 B1 * 3/2002 Lagerweij et al. ........... 248/430
6,616,233 B1 * 9/2003 Debus et al. ................ 297/341
6,767,063 B1 * 7/2004 Abdella et al. .......... 297/378.12

(Continued)

Primary Examiner—A. Joseph Wujciak, III
(74) Attorney, Agent, or Firm—Shoemaker and Mattare

(57) ABSTRACT

A sliding-type automobile seat comprising a seat cushion frame, a slide rail mechanism for allowing the seat to be slidingly moved, slide lock mechanisms for causing the seat to be releasably locked at predetermined positions, a substantially U-shaped operating lever for causing the seat to be released from a locked state, and connection mechanisms for causing both end portions of the substantially U-shaped operating lever to the slide lock mechanisms, the slide rail mechanism comprising a pair of parallel lower rails mounted on a floor surface of an automobile, and a pair of parallel upper rails attached to a lower portion of the seat cushion frame and slidably engaged with the pair of parallel lower rails, each of the slide lock mechanisms comprising a lock member swingably mounted to a corresponding upper rail and urged upward at one end portion thereof by a spring, the lock member including a first engaging member, and a second engaging member provided at a corresponding lower rail, the first engaging member and the second engaging member being adapted to be releasably engaged with each other, to thereby cause the seat to be locked at the predetermined positions, each of the connection mechanisms comprising a connection member having a member for stoppingly engaging the lock member, and the member for stoppingly engaging the lock member being engaged with the lock member, whereby the operating lever is connected, via the connection mechanisms, to the slide rock mechanism by one-touch operation.

3 Claims, 7 Drawing Sheets

U.S. PATENT DOCUMENTS

| | | | |
|---|---|---|---|
| 6,772,985 B2 * | 8/2004 | Lee | 248/424 |
| 6,773,068 B2 * | 8/2004 | Shinozaki | 297/344.1 |
| 7,293,752 B2 * | 11/2007 | McCulloch et al. | 248/429 |
| 2003/0006355 A1 * | 1/2003 | Horsfield et al. | 248/429 |
| 2003/0085330 A1 * | 5/2003 | Lee | 248/430 |
| 2004/0217251 A1 * | 11/2004 | Leguede et al. | 248/424 |
| 2005/0056761 A1 * | 3/2005 | Danjo et al. | 248/429 |

* cited by examiner

SLIDING-TYPE AUTOMOBILE SEAT

TECHNICAL FIELD

The present invention relates to a sliding-type automobile seat that can be slidingly moved, via a slide rail mechanism, forward and rearward in an automobile.

BACKGROUND ART

As a sliding-type automobile seat of this kind, a sliding-type automobile seat is disclosed in Japanese Patent Application Laid-Open No. 2004-51082. Referring now to FIGS. 1 to 5, the conventional sliding-type automobile seat will be discussed in order to facilitate understanding of the present invention. As shown in FIG. 1, this automobile seat includes a seat cushion frame 1 for a seat cushion thereof. The seat cushion frame 1 comprises a pair of spaced apart side frame sections 1a, a pan frame section 1b arranged and fixed between forward portions of the side frame sections 1a, and a rear frame section 1c arranged and fixed between rearward portions of the side frame sections 1a.

The automobile seat can be slidingly moved forward and rearward in an automobile via a slide rail mechanism 2. As shown in FIG. 2, the slide rail mechanism 2 comprises upper rails 2a attached to lower portions of the side frame sections 1a (only one side frame section 1a and only one upper rail 2a are shown in FIG. 2), and a pair of parallel lower rails 2b mounted on a floor surface of the automobile via stand leg portions 3a, 3b (only one lower rail 2b is shown in FIG. 2). The upper rails 2a are slidably engaged with the lower rails 2b as will be fully discussed hereinafter, whereby the seat can be slidingly moved forward and rearward in the automobile.

As shown in FIG. 3, each of the upper rails 2a (only one upper rail 2a is shown in FIG. 3) comprises a pair of members 20a, 20b of substantially J-shapes in vertical-section that are fixed back-to-back to a lower portion of a corresponding side frame section 1a of the automobile seat by a support pin 40 and hang downward from the side frame section 1a. Each of the lower rails 2b (only one lower rail 2b is shown in FIG. 3) has a longitudinal body 21 of a substantially U-shape in cross-section and is mounted on the floor surface of the automobile with an opening portion thereof facing upward. The lower rail body 21 includes inward bent flanges 22a, 22b of substantially L-shapes in cross-section that are bent inward from both ends of the substantially U-shaped lower rail body 21 in such a manner to allow a space to be produced between the inward bent flanges 22a, 22b.

Each of the upper rails 2a is combined with a corresponding lower rail 2b by causing lower curved portions 20a', 20b' of the substantially J-shaped members 20a, 20b hanging downward from the side frame section 1a to be inserted into the substantially U-shaped lower rail body 21 through the space between the inward bent flanges 22a, 22b of the lower rail body 21, and causing tip end portions of the lower curved portions 20a', 20b' to be arranged inside the inward bent flanges 22a, 22b of the lower rail body 21. Moreover, between the lower curved portions 20a', 20b' of the substantially J-shaped members 20a, 20b of the upper rail body 21 and a bottom surface of the lower rail body 21, a plurality of rollers 23 are disposed (only one roller 23 is shown in FIG. 3), whereby the seat can be smoothly slid along the lower rails.

The sliding-type automobile seat is provided with slide lock mechanisms for causing the seat to be locked at predetermined positions with respect to the lower rails 2b. As shown in FIG. 4, the slide lock mechanisms include lock plates 4 arranged at side portions of the upper rails 2a (only one upper rail 2a and only one lock plate 4 are shown in FIG. 4). An operating lever 5 for releasing the seat from a locked condition is provided so as to be bridged between the lock plates 4.

Again referring to FIGS. 3 and 4, each of the lock plates 4 extends along the side portions of the substantially J-shaped members 20a, 20b of a corresponding upper rail 2a. The lock plate 4 is pivotally supported, at the substantially middle portion of its longitudinal direction, to the side portions of the substantially J-shaped members 20a, 20b of the upper rail 2a by the support pin 40, whereby the lock plate 4 is vertically swingable around the support pin 40. Moreover, the lock plate 4 is formed, at its region adjacent a rear end portion thereof, with an elongated hole 41 vertically extending. A guide pin 42 projects from the side portion of the upper rail 2a and is inserted through the elongated hole 41 formed in the lock plate 4, so that the vertical swinging movement of the lock plate 4 is guided along the elongated hole 41.

The lock plate 4 is urged by a coil spring 43 so as to be always pulled upward at the rear end portion thereof. More particularly, the coil spring 43 is retained at one end portion thereof to a protruding piece 43a provided at a corresponding side frame section 1a, and retained at the other end portion thereof to a protruding piece 43b bent from an upper edge of the lock plate 4, whereby the coil spring 43 is provided between the side frame section 1a and the lock plate 4.

Each of the slide lock mechanisms further includes first and second engaging means. The first engaging means comprises an engaging piece 44 projecting laterally from a lower edge of a corresponding lock plate 4 and a plurality of receiving holes 45 formed in the engaging piece 44. The lower curved portions 20a', 20b' of the substantially J-shaped members 20a, 20b of the upper rail 2a are formed with slits 46. The engaging piece 44 of the lock plate 4 projects so as to cross the inward bent flange 22a of the lower rail 2b through the slits 46.

The second engaging means includes a plurality of protruding teeth 47 that are formed by making a lower portion of an inward bent flange 22a of a corresponding lower rail 2b into a concave/convex form. The protruding teeth 47 are releasably engaged with the receiving holes 45 formed in the engaging piece 44 of the lock plate 4.

The operating lever 5 is formed in a substantially U-shape as viewed from above by causing a pipe material to be bent. Both end portions of the U-shaped operating lever 5 are flatly crushed and welded to forward portions of the lock plates 4, whereby the operating lever 5 is connected to the lock plates 4. As shown in FIG. 1, the operating lever 5 is bridged between the lock plates 4 and arranged under the seat cushion frame 1 with a forward portion thereof projecting forward of the seat.

In the slide lock mechanisms, the lock plates 4 are always urged upward at the rear end portions thereof by the coil springs 43 and the engaging pieces 44 are releasably meshed at the receiving holes 45 thereof with the protruding teeth 47 as shown in FIG. 4, whereby the upper rails 2a are locked with respect to the lower rails 2b so as to be unable to be slid relative to the lower rails 2b. On the other hand, when the operating lever 5 is pulled up in such a direction that it approaches the seat cushion frame, namely, in such a direction as to be indicated in FIG. 5 by an arrow, the rear end portions of the lock plates 4 are swung downward about the support pins 40 against the actions of the coil springs 43, whereby the receiving holes 45 of the lock plates 4 are released from the engagement with the protruding teeth 47 of the lower rails 2b, the engagement of the upper rails 2a with respect to the lower rails 2b is therefore released, and the seat is brought to a condition where it can be slidingly moved forward and rearward in the automobile.

In a case where the conventional automobile seat constructed as discussed above is assembled, it is necessary to cause the lock plates to be individually mounted to the upper rails. However, since the lock plates are previously welded to the both end portions of the substantially U-shaped operating lever, when such lock plates are individually mounted to the upper rails, mounting work of one of the lock plates to one of the upper rails will be interrupted by the other of the lock plates as well as the operating lever and a lot of time is taken for connecting of the operating lever to the lock plates and assembling the entire lock mechanisms.

Moreover, in the automobile provided with the seat constructed as discussed above, when any baggage, luggage, etc. is put on the floor surface of the automobile while being carelessly contacted with the operating lever, there is a possibility that the operating lever and/or the baggage, luggage, etc. will be damaged or deformed and the operating lever can not be properly operated. In this condition, if the operating lever is forcedly operated, there is a possibility that the operating lever will cause the baggage, luggage, etc. to be damaged or deformed.

The present invention has been made in view of the above-mentioned problems of the prior art automobile seat.

It is therefore an object of the present invention to provide a sliding-type automobile seat which facilitates connecting of an operating lever to slide lock mechanisms of the sliding-type automobile seat.

It is another object of the present invention to provide a sliding-type automobile seat which is simply constructed and in which even if any baggage, luggage, etc. is contacted with the operating lever of the automobile seat, the baggage, luggage, etc. and/or the operating lever of the automobile seat can be prevented from being damaged or deformed.

SUMMARY OF THE INVENTION

In accordance with the present invention, there is provided a sliding-type automobile seat which comprises a seat cushion frame, a slide rail mechanism for allowing the seat to be slidingly moved, slide lock mechanisms for causing the seat to be releasably locked at predetermined positions, a substantially U-shaped operating lever for causing the seat to be released from a locked state, and connection mechanisms for causing both end portions of the substantially U-shaped operating lever to the slide lock mechanisms. The slide rail mechanism comprises a pair of parallel lower rails mounted on a floor surface of an automobile, and a pair of parallel upper rails attached to a lower portion of the seat cushion frame and slidably engaged with the pair of parallel lower rails. Each of the slide rock mechanisms comprises a lock member swingably mounted to a corresponding upper rail and urged upward at one end portion thereof by a spring, the lock member including first engaging means, and second engaging means provided at a corresponding lower rail. The first engaging means and the second engaging means are releasably engaged with each other, to thereby cause the seat to be locked at the predetermined positions. Each of the connection mechanisms comprises a connection member having means for stoppingly engaging the lock member. The means for stoppingly engaging the lock member is engaged with the lock member, whereby the operating lever is connected, via the connection mechanisms, to the slide rock mechanism by one-touch operation.

The means for stoppingly engaging the lock member may comprise a lower joint mounted on the connection member, and an upper joint fixed on the lower joint and extending along the lower joint in such a manner to allow a predetermined space the upper joint and the lower joint. The lock member may comprise a receiving piece for receiving one end portion of the lower joint, a holding-down piece for holding down the lower joint in the space between the lower joint and the upper joint, and a leaf spring having a first spring portion for causing the one end portion of the lower joint to be pressed against the receiving piece to interposingly hold the one end portion of the lower joint therebetween, and a second spring portion for pushing up the upper joint in the space to cause the holding-down piece to be pressed against the lower joint.

The upper joint may have a through-hole formed therein and the left spring may be provided with an engaging claw, the engaging claw being engaged with the through-hole.

The substantially U-shaped operating lever may include extending portions linearly extending laterally from the both end portions thereof, and support pins fitted in the extending portions of the operating lever, each of the support pins being connected to a connection member of a corresponding connection mechanism, coil springs for causing the operating lever to be urged upward are mounted at coiled portions thereof around the support pins, first end portions of the coil springs being stoppingly engaged with end portions of the support pins and second end portions of the coil springs being stoppingly engaged with connection members of the connection mechanisms, and stopper members provided around the support pins for engaging the connection members from above.

DESCRIPTION OF THE PREFERRED EMBODIMENT

Referring to FIGS. 6 to 12, a sliding-type automobile seat according to an embodiment of the present invention will be discussed hereinafter. The sliding-type automobile seat according to the present invention is substantially similar to the conventional automobile seat shown in FIGS. 1 to 5 except that a different operating lever 5', different slide lock mechanisms, and connection mechanisms for facilitating connecting of the operating lever 5' and the slide lock mechanisms are employed. Therefore, description of the respective components except the operating lever, the connection mechanisms and the slide lock mechanisms will not be repeated.

Figure 9:
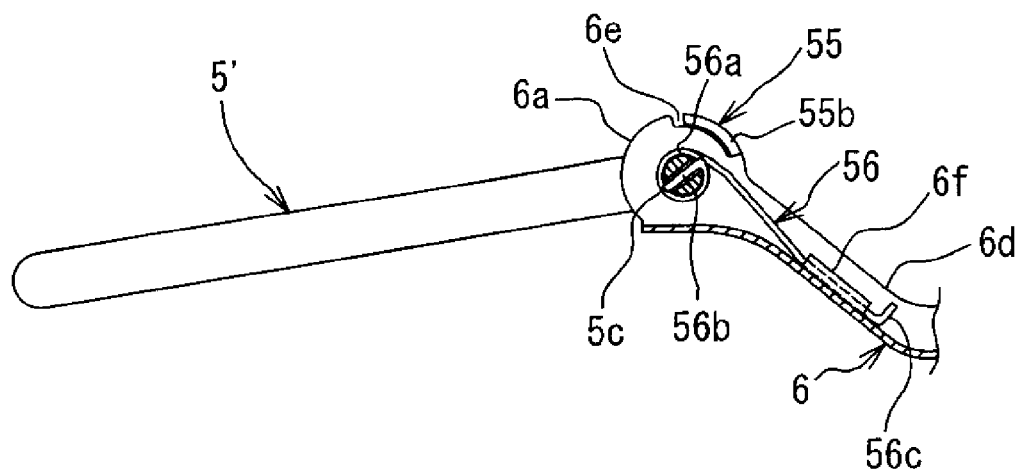
FIG. 9 is an enlarged sectional view, taken along a line B-B in FIG. 8.
Figure 10:
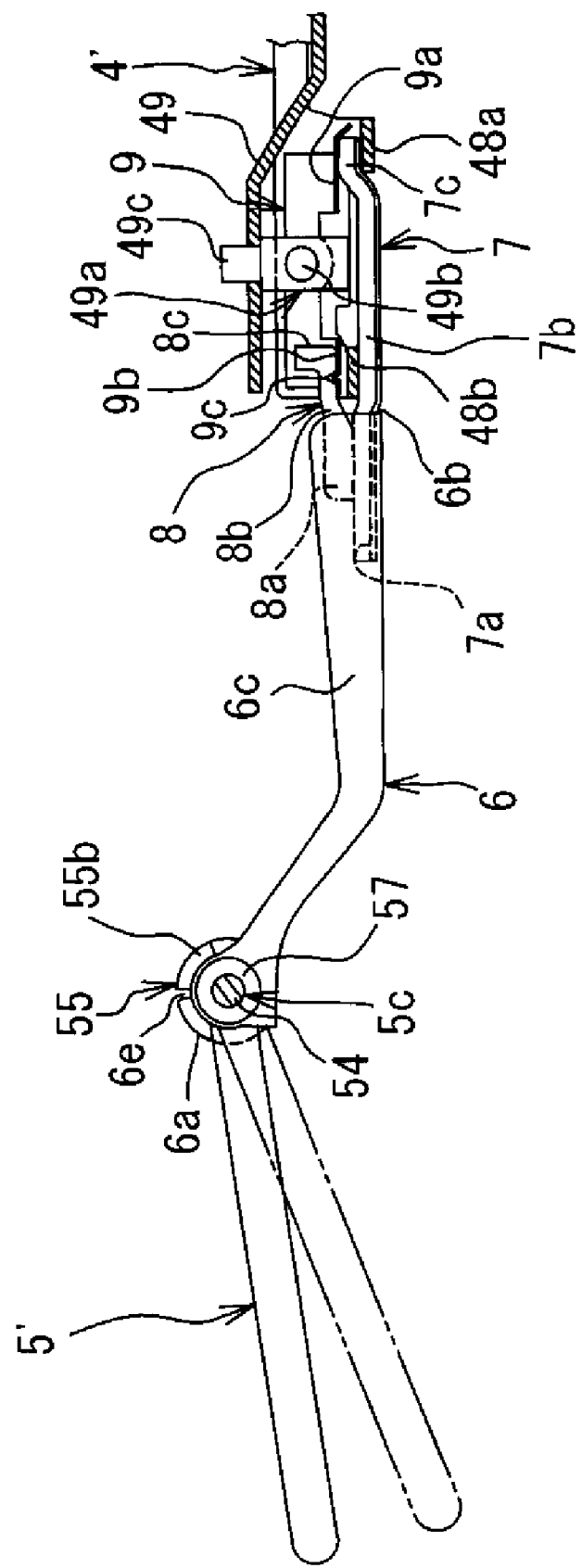
FIG. 10 is a view that shows a condition where the operating lever shown in FIG. 6 is connected to slide lock mechanisms via the connection mechanisms.

The slide lock mechanisms of the automobile seat according to the present invention comprises elongated lock members 4' (see FIG. 10 showing only one lock member 4') that are different from the lock plates 4 of the conventional automobile seat, swingably mounted to the upper rails and provided with the first engaging means 44, 45 (see FIGS. 3), and the second engaging means 47 (see FIG. 3) provided at the lower rails. The first and second engaging means are releasably engaged with each other, whereby the seat is locked at predetermined positions. The operating lever 5' serves as means to release the engagement between the first engaging means and the second engaging means and is connected to the lock members 4' via longitudinal connection members 6 of the connection mechanisms (see FIGS. 7 to 10 showing only one connection member 6).

Figure 1:
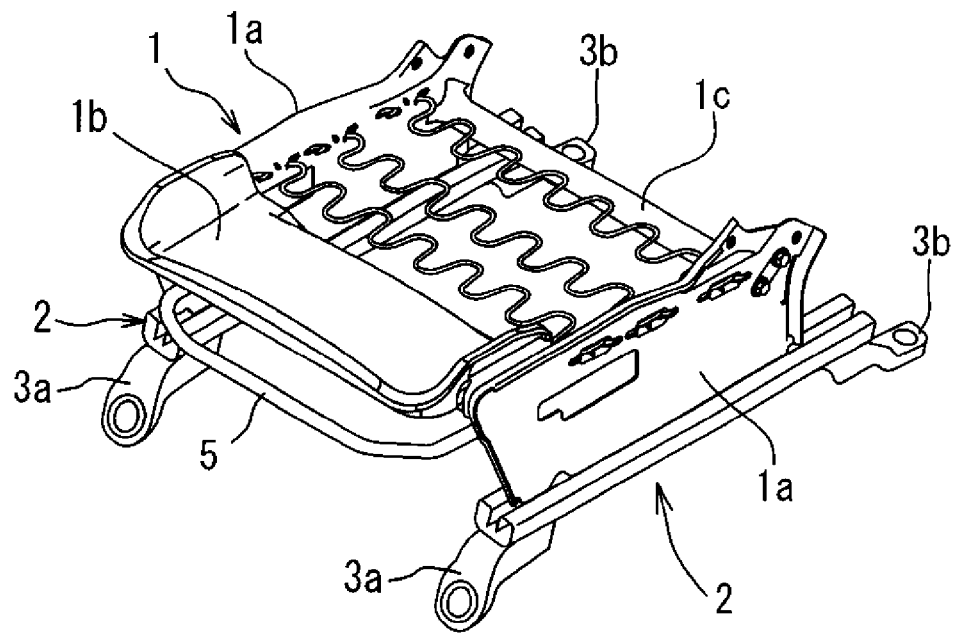
FIG. 1 is a perspective view showing a seat cushion frame of a conventional sliding-type automobile seat.
Figure 2:
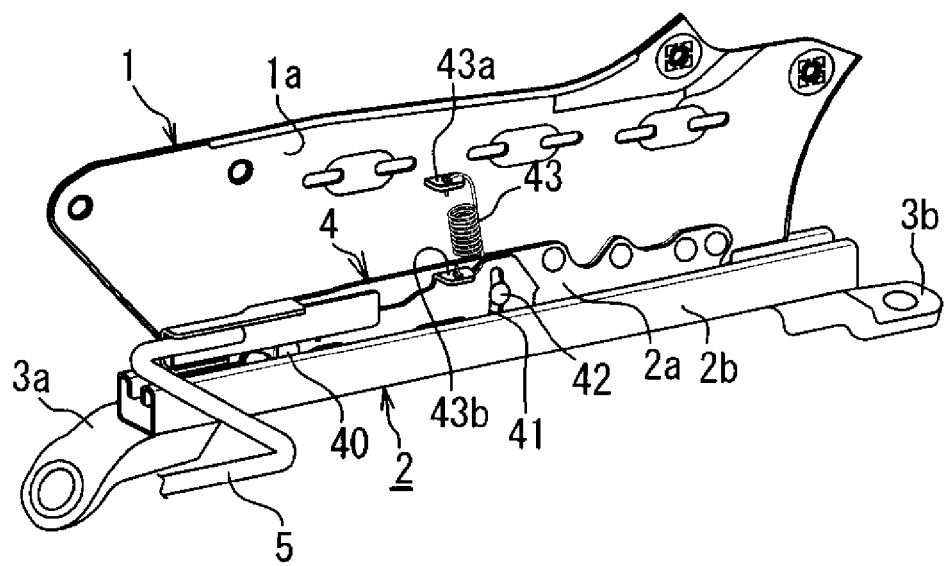
FIG. 2 is a perspective view showing only one of side frame sections of the seat cushion frame shown in FIG. 1.
Figure 3:
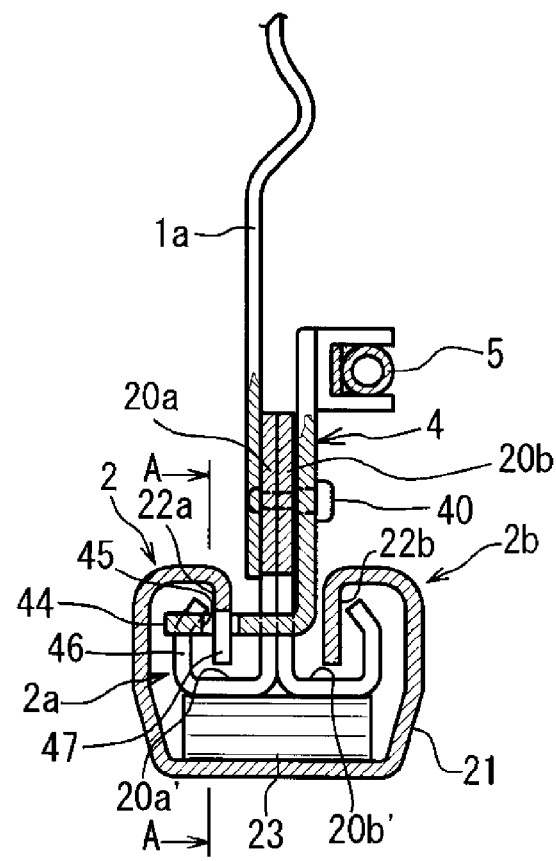
FIG. 3 is a sectional view of a slide rail mechanism provided at the seat cushion frame shown in FIG. 1.
Figure 4:
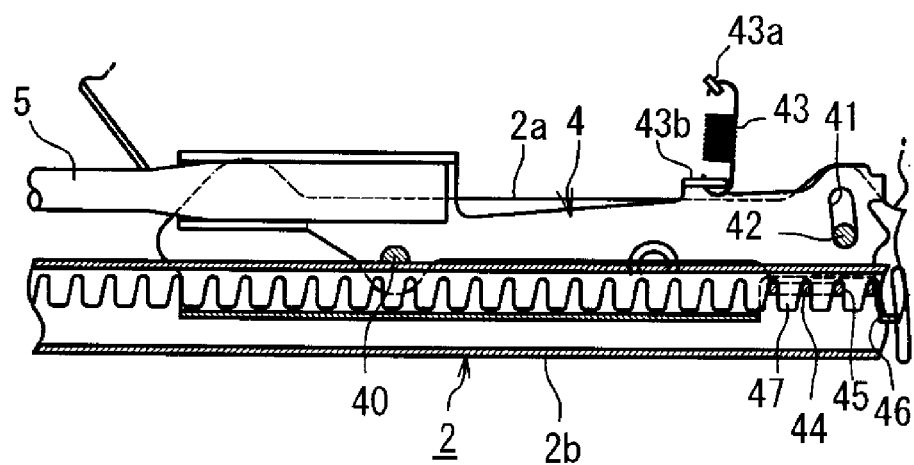
FIG. 4 is a sectional view of the slide rail mechanism, taken along a line A-A in FIG. 3.
Figure 5:
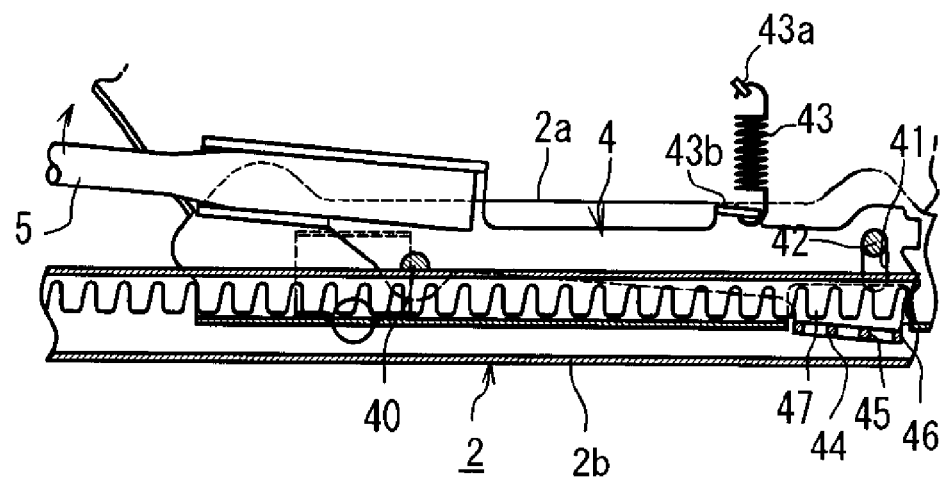
FIG. 5 is a view showing a condition where the seat is released from a locked state.
Figure 6:
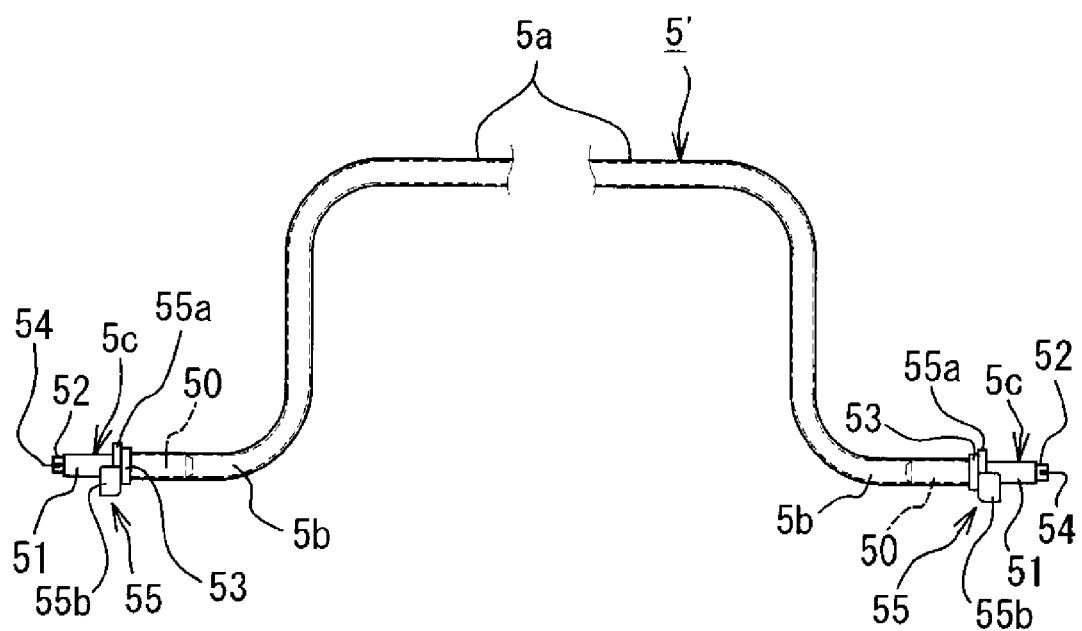
FIG. 6 is a plan view showing an operating lever which is employed in a sliding-type automobile seat according to the present invention and in which a central portion of the operating lever has been left out of the illustration.

The operating lever 5' is formed in a predetermined shape by causing a pipe material to be bent. More particularly, as shown in FIG. 6, the operating lever 5' comprises a substantially U-shaped body having a central axial grip-portion 5a which is to be gripped by an occupant on the seat when the operating lever 5' is operated by the occupant, and left and right axial portions 5b, 5b linearly projecting laterally from both ends of the substantially U-shaped body. Annular flanges 53, 53 are provided around end regions of the left and right axial portions 5b, 5b. Support pins 5c, 5c are press-fitted in the end regions of the left and right axial portions 5b, 5b of the operating lever 5'.

The support pins 5c, 5c comprise inner axial portions 50, 50 press-fitted in the end regions of the left and right axial portions 5b, 5b of the operating lever 5', outer axial portions 51, 51 that are to be connected to the longitudinal connection members 6 of the connection mechanisms, and protruding end portions 52, 52 which project out of the outer axial portions 51, 51 and around which bush nuts or E-rings that will be discussed hereinafter are mounted. Moreover, slits 54 in which end portions of coil springs that will be discussed hereinafter are engagedly retained are formed in the protruding end portions 52, 52 by cutting deeply into the protruding end portions 52, 52.

Stoppers 55, 55 are provided around the outer axial portions 51, 51 of the support pins 5c, 5c. The stoppers 55, 55 are to be engaged with rising flanges of the longitudinal connection members 6 from above, when the connection members 6 are connected to the left and right axial portions 5b, 5b of the operating lever 5'. The stoppers 55, 55 comprises ring portions 55a fixedly mounted around the outer axial portions 51, 51, and protruding portions 55b protruding laterally from upper edges of peripheries of the ring portions 55a.

Figure 7:
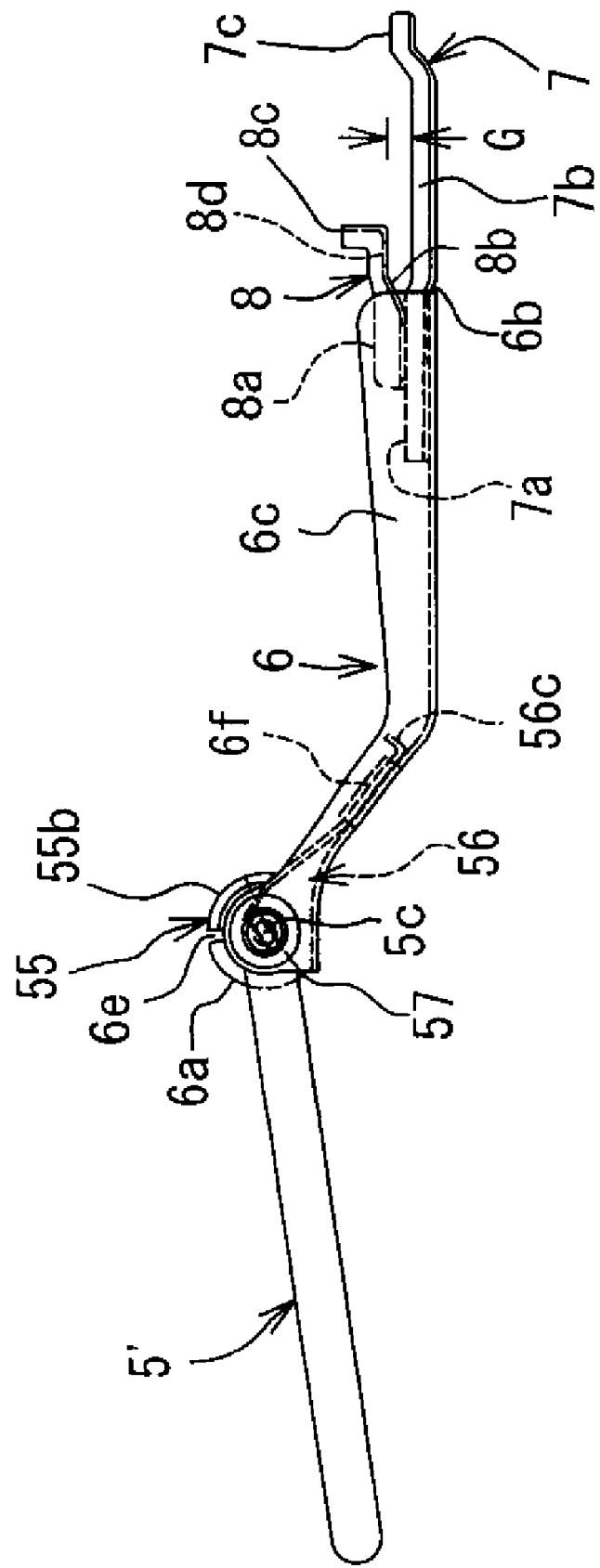
FIG. 7 is a view illustrating a condition where the operating lever shown in FIG. 6 is connected to connection mechanisms.
Figure 8:
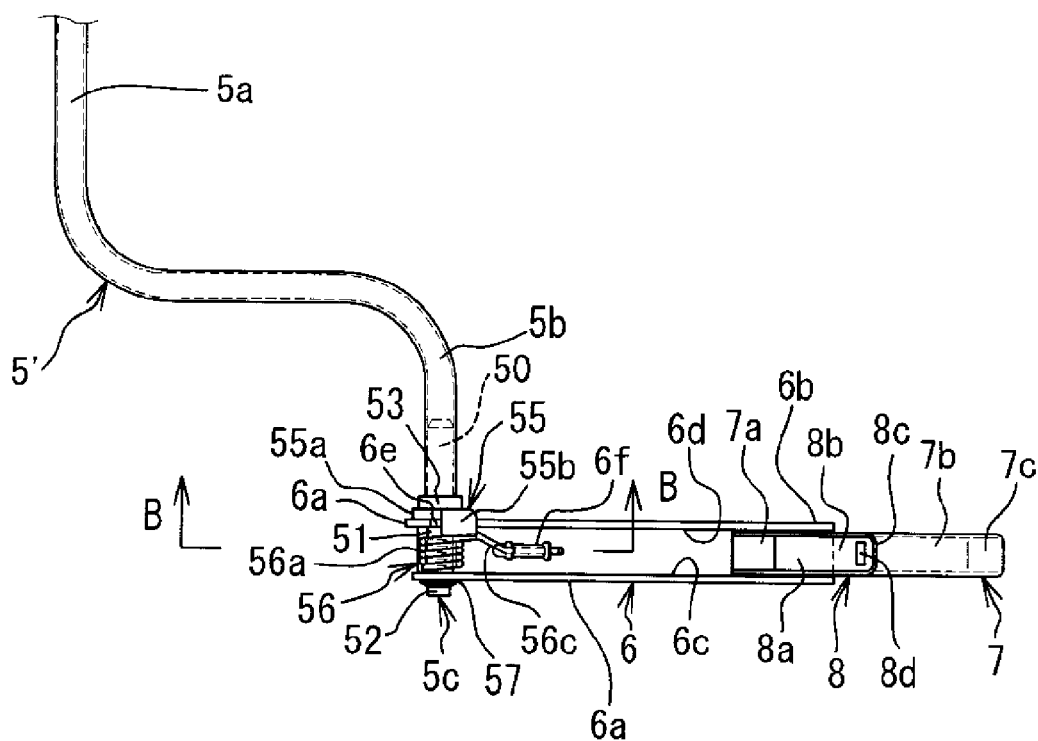
FIG. 8 is a view that fully shows connection between the operating lever and the connection mechanisms.

As shown in FIGS. 7 to 9, the left and right axial portions 5b of the operating lever 5' are connected to forward end portions 6a of the longitudinal connection members 6 via the support pins 5c (respective components in connection with only one of the connection mechanisms are shown in FIGS. 7 to 9). The connection mechanisms include lower joints 7 provided on rearward end portions 6b of the longitudinal connection members 6 thereof and engagedly connected to the lock members 4' that are mounted to the upper rails, and upper joints 8 fixed onto the lower joints 7. The upper joints 8 extend rearward in such a manner to allow spaces to be produced between the lower joints 7 and the upper joints 8 and are engagedly connected to the lock members 4'.

As shown in FIG. 7, the longitudinal connection members 6 are formed in substantially L-shapes and include intermediate portions 6c extending between the forward end portions 6a and the rearward end portions 6b so as to have slopes descending from the forward end portions 6a. The support pins 6c of the operating lever 5' are penetrated through the forward end portions 6a of the longitudinal connection members 6, whereby the U-shaped operating lever 5' is connected to the longitudinal connection members 6. Moreover, as shown in FIG. 8, each of the longitudinal connection members 6 is formed in a substantially U-shape in cross-section and includes a pair of spaced apart rising flanges 6c, 6d. In upper edge regions of the rising flanges 6d of the connection members 6 which are located at the forward end portions 6a of the connection members 6, receiving recesses 6e for engagingly receiving the protruding portions 55b of the stoppers 55 of the operating lever 5' are formed so as to have widths larger than those of the protruding portions 55b (widths measured in circumferential directions of the ring portions 55a of the stoppers 55).

Figure 11:
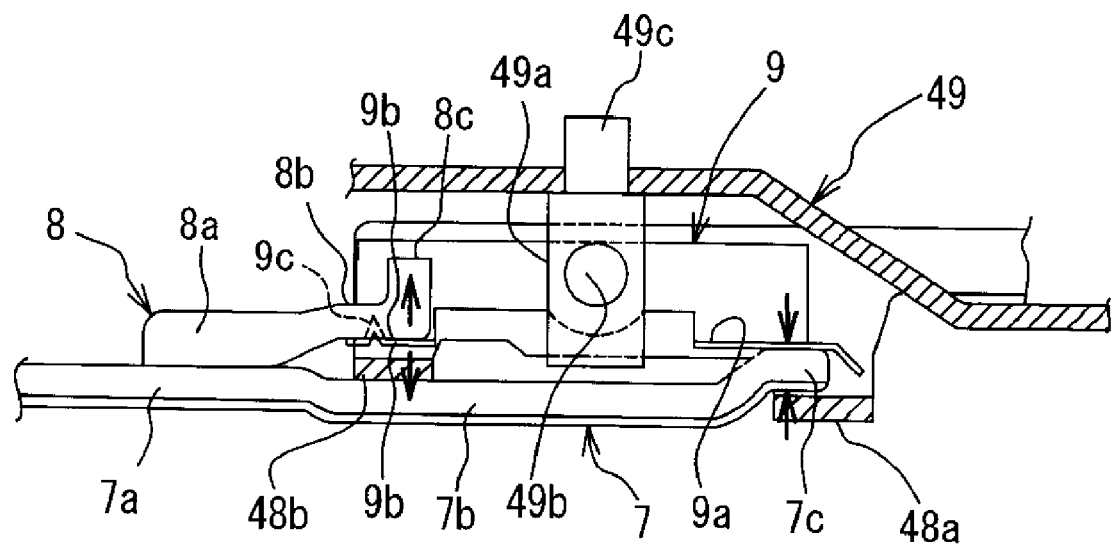
FIG. 11 is an enlarged view that fully shows the condition where the operating lever is connected to the slide lock members via the connection mechanisms.

As shown in FIGS. 10 and 11, the lower joints 7 comprise forward end portions 7a fixedly welded onto inner surfaces of bottoms of the connection members 6, rearward end portions 7c located at positions higher than the forward end portions 7a, and longitudinal intermediate portions 7b extending between the forward end portions 7a and the rearward end portions 7c. The longitudinal intermediate portions 7b extend slightly downward relative to the rear end portions 6b of the connection members 6, further extend horizontally and still further extend upward to the rearward end portions 7c.

The upper joints 8 are formed in substantially U-shapes in cross-section and comprises forward end portions 8a fixedly welded onto the forward end portions 7a of the lower joints 7, rear end portions 8c rising up, and intermediate portions 8b interconnecting the forward end portions 8a and the rear end portions 8c, and extending from the forward end portions 8a along the lower joints 7 so as to be vertically spaced apart from the lower joints 7 at predetermined intervals G (FIG. 7). Moreover, the intermediate portions 8b are formed with elongated through-holes 8d of substantially rectangle-shapes at regions thereof which are adjacent the rearward end portions 8c of the upper joints 8.

The elongated lock members 4' comprise longitudinal plate-shaped portions, spaced apart side portions protruding forward from forward ends of the longitudinal plate-shaped portions, receiving pieces 48a provided at forward ends of the spaced apart side portions and bridged between lower regions of the spaced apart side portions, and holding-down pieces 48b provided at regions of the spaced apart side portions that are adjacent the longitudinal plate-shaped portions, the holding-down pieces 48b being bridged between the lower regions of the spaced apart side portions. When the connection mechanisms connected to the operating lever 5' are connected to the slide lock mechanisms, the receiving pieces 48a are adapted to engagingly receive the rear end portions 7c of the lower joints 7 and the holding-down pieces are inserted in the intervals G between the intermediate portions 7b of the lower joints 7 and the upper joints 8 and hold down the longitudinal intermediate portions 7b of the lower joints 7. The receiving pieces 48a and the holding-down pieces 48b are formed into substantially U-shapes in cross-section.

Moreover, elongated leaf springs 9 are attached to the lock members 4'. The leaf springs 9 are arranged between the spaced apart side portions of the elongated lock members 4' and comprise bodies having substantially U-shaped in cross-section. The substantially U-shaped bodies comprise first spring portions 9a for pressing the rearward end portions 7c of the lower joints 7 against the receiving pieces 48a of the lock members 4' and interposedly holding the rearward end portions 7c of the lower joints 7 therebetween, and second spring portions 9b inserted in the intervals G between the lower joints 7 and the upper joints 8 for pushing the upper joints 8 upward to cause the holding down pieces 48b to be pressed against the longitudinal intermediate portions 7b of the lower joints 7.

The first spring portions 9a and the second spring portions 9b are formed by bottom surfaces of the substantially U-shaped bodies of the leaf springs 9. Engaging claws 9c of substantially triangle-shapes are provided on the second spring portions 9b. Moreover, spring-supporting members 49a are arranged between the spaced apart side portions of the lock members 4' and swingably supported to the lock members 4' via support pins 49b. The leaf springs 9 are also swingably supported to the lock members 4' via the support pins 49b. Moreover, elongated return springs 49 are attached at one end portions thereof to the spring-supporting members 49a by pins 49c. Therefore, the return springs 49 are also swingable together with the spring-supporting members 49a. The return springs 49 serve to urge the connection members 6 in such a direction to cause the connection members 6 to be locked with respect to the lock members 4', when the connection members 6 connected to the U-shaped operating lever 5' are connected to the lock members 4' for assembling. Though not shown, the lock members 4' are attached to the upper rails by causing the pins 49c to be penetrated through the upper rails and then causing the pins 49c to be riveted over surfaces of the upper rails. The lock members 4' are urged upward by the coil springs (not shown) in the same manner as the lock plates 4 of the conventional seat are done. Moreover, though not shown, the lock members 4' are provided at the longitudinal plate-shaped portions thereof with the engaging pieces 44 (FIG. 3) having the engaging holes 45 (see FIG. 3) with which the protruding teeth 47 (see FIG. 3) of the lower rails are engaged, like the lock plates 4 of the conventional seat.

The lock members 4' are individually mounted to the upper rails and the operating lever 5' are then connected via the connection mechanisms to the lock members 4', so that the connecting of the operating lever 5' to the slide lock mechanisms is carried out by one-touch operation with utilizing the connection mechanisms constructed as discussed above.

The connecting of the operating lever 5' to the slide lock mechanisms through the connection mechanisms connected to the operating lever 5' is carried out as follows. As shown in FIGS. 10 and 11, the connection members 6 connected to the left and right axial portions of the operating lever 5' are engaged at the rearward end portions 7c of the lower joints 7 thereof with the receiving pieces 48a of the lock members 4', and the holding-down pieces 48b of the lock members 4' are inserted into the gaps G between the longitudinal intermediate portions 7b of the lower joints 7 and the upper joints 8 while being applied onto the longitudinal intermediate portions 7b of the lower joints 7 and engaged at the through-holes 8d of the upper joints 8 with the engaging claws 9c of the leaf springs 9. At this time, the rearward end portions 7c of the lower joints 7 are pressed against the receiving pieces 48a of the lock members 4' by the first spring portions 9a of the leaf springs 9, whereby the rearward end portions 7c of the lower joints 7 are interposedly held between the first spring portions 9a of the leaf springs 9 and the receiving pieces 48a. Moreover, the upper joints 8 are pushed up in the gap G between the upper joints 8 and the lower joints 7 by the second spring portions 9b of the leaf springs 9, to thereby cause the holding-down pieces 48b of the lock members 4' to be pressed against the longitudinal intermediate portions 7b of the lower joints 7. Thus, the connecting of the operating lever 5' to the slide lock mechanisms through the connection mechanisms can be easily performed by one-touch operation. Therefore, it is possible to facilitate speedy assembling work of the entire lock mechanisms.

In addition to the urging by the leaf springs 9, the through-holes 8d formed in the regions of the upper joints 8 which are adjacent the rearward end portions 8c of the upper joints 8, and the engaging claws 9c provided on the second spring portions 9b of the leaf springs 9 are engaged with each other, whereby the connection members 6 connected to the left and right axial portions of the operating lever 5' can be securely connected to the lock members 4' so as not to be removed from the lock members 4'.

The operating lever 5' is connected at the left and right axial portions thereof to the forward ends 6a of the connection members 6 by the support pins 5c with protruding portions 55b of the stoppers 55 thereof being received in the receiving recesses 6e of the connection members 6. The entire operating lever 5' is urged upward by coil springs 56. Thus, the operating lever 5' is adapted to be pivotable downward of the connection members 6 and able to be pulled up in order that the lock members 4' are released from locked states.

Figure 12:
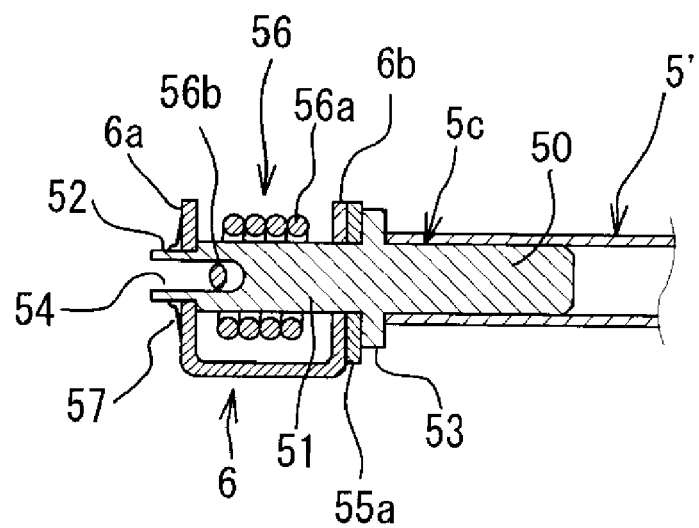
FIG. 12 is an enlarged sectional view that is of assistance in explaining a condition where the connection mechanisms are connected to the operating lever.

As shown in FIGS. 8, 9 and 12, the coil springs 56 are stretched between the support pins 5c and the connection members 6 by causing coil portions 56a of the coil springs 56 to be mounted around the outer axial portions 51 of the support pins 5c penetrating the rising flanges 6c, 6d of the connection members 6, causing first end portions 56b of the coil springs 56 to be engagedly fitted in the slits 54 of the support pins 5c, and causing the second end portions 56c of the coil springs 56 to be engagedly fitted in spring receiver sleeves 6f that are provided on the inner surfaces of the bottoms of the connection members 6 (only one of the connection members 6 and only one of the support pins 5c of the operating lever 5' are shown in FIGS. 8, 9 and 12). Incidentally, the bush nuts or E-rings 57 are mounted on the protruding axial portions 52 of the support pins 5c, whereby the support pins 5c are prevented from being disconnected from the connection members 6.

The entire operating lever 5' is adapted to be able to be pivoted downward against the actions of the coil springs 56 until the protruding portions 55b of the stoppers 55 are abutted against edges of the receiving recesses 6e of the connection members 6 (see FIG. 10), so that even if any baggage, luggage, etc. is contacted with the operating lever 5' from above, the baggage, luggage, etc and/or the operating lever 5' can be prevented from being damaged or deformed. Moreover, it is possible to easily pull the operating lever 5' up in order that the lock members 4' are released from the engagement with the lower rails.

The terms and expressions which have been employed herein are used as terms of description, not of limitation. There is no intention in the use of such terms and expressions of excluding any equivalents of the features described or any portions thereof. It is recognized, however, that various modifications are possible within the scope of the invention claimed.

What is claimed is:

1. A sliding-type automobile seat comprising:

a seat cushion frame;

a slide rail mechanism for allowing said seat to be slidingly moved;

slide lock mechanisms for causing said seat to be releasably locked at predetermined positions;

a substantially U-shaped operating lever for causing said seat to be released from a locked state; and connection mechanisms for causing both end portions of said substantially U-shaped operating lever to said slide lock mechanisms;

said slide rail mechanism comprising a pair of parallel lower rails mounted on a floor surface of an automobile, and a pair of parallel upper rails attached to a lower portion of said seat cushion frame and slidably engaged with the pair of parallel lower rails;

each of said slide lock mechanisms comprising a lock member swingably mounted to a corresponding upper rail and urged upward at one end portion thereof by a spring, said lock member including first engaging member, and second engaging member provided at a corresponding lower rail;

said first engaging member and said second engaging member being adapted to be releasably engaged with each other, to thereby cause said seat to be locked at the predetermined positions;

each of said connection mechanisms comprising a connection member having means for stoppingly engaging said lock member; and said means for stoppingly engaging said lock member being engaged with said lock member, whereby said operating lever is connected, via said connection mechanisms, to said slide rock mechanism by one-touch operation;

wherein said means for stoppingly engaging said lock member comprises a lower joint mounted on said connection member, and an upper joint fixed on said lower joint and extending along said lower joint in such a manner to allow a predetermined space said upper joint and said lower joint;

said lock member comprises a receiving piece for receiving one end portion of said lower joint, a holding-down piece for holding down said lower joint in said space between said lower joint and said upper joint, and a leaf spring having a first spring portion for causing the one end portion of said lower joint to be pressed against said receiving piece to interposingly hold the one end portion of said lower joint therebetween, and a second spring portion for pushing up said upper joint in the space to cause said holding-down piece to be pressed against said lower joint; and said operating lever is connected via said connection member to said lock member after the lock member is attached to the corresponding upper rail.

2. A sliding-type automobile seat according to claim 1, wherein said upper joint has a through-hole formed therein and said leaf spring is provided with an engaging claw, said engaging claw being engaged with said through-hole.

3. A sliding-type automobile seat according to claim 2, wherein said substantially U-shaped operating lever includes extending portions linearly extending laterally from the both end portions thereof, and support pins fitted in said extending portions of the operating lever, each of said support pins being connected to a connection member of a corresponding connection mechanism, coil springs for causing said operating lever to be urged upward are mounted at coiled portions thereof around said support pins, first end portions of said coil springs being stoppingly engaged with end portions of said support pins and second end portions of said coil springs being stoppingly engaged with connection members of said connection mechanisms, and stopper members provided around said support pins for engaging said connection members from above.

* * * * *